Feb. 21, 1961    T. M. LAAKSO ET AL    2,972,538
CONDENSATION PRODUCTS OF C-VINYLPYRIDINIUM HALOKETONE
POLYMERS WITH HYDRAZIDES CONTAINING
QUATERNARY NITROGEN GROUPS
Filed Sept. 3, 1957
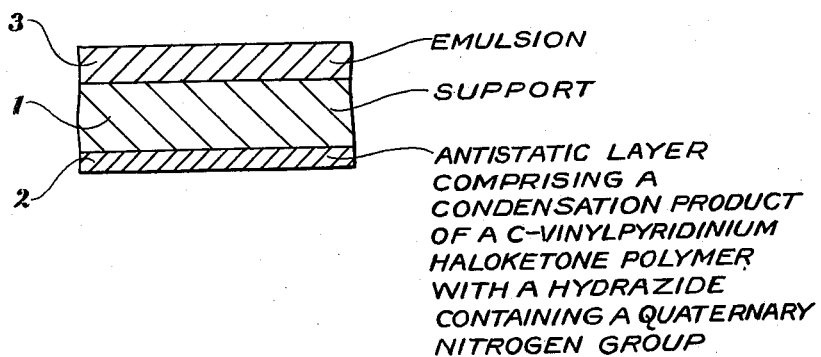
Thomas M. Laakso
Jack L.R. Williams
INVENTORS
BY R. Frank Smith
Leonard E. Brancken
ATTORNEY & AGENT United States Patent Office 2,972,538
Patented Feb. 21, 1961

2,972,538

CONDENSATION PRODUCTS OF C-VINYLPYRIDINIUM HALOKETONE POLYMERS WITH HYDRAZIDES CONTAINING QUATERNARY NITROGEN GROUPS

Thomas M. Laakso and Jack L. R. Williams, Rochester, N.Y., assignors to Eastman Kodak Company, Rochester, N.Y., a corporation of New Jersey Filed Sept. 3, 1957, Ser. No. 681,604

10 Claims. (Cl. 96—87)

This invention relates to condensation products of certain quaternary salts of C-vinylpyridine polymers with certain substituted hydrazine salts, and more particularly to quaternary salts obtained by reacting poly-C-vinylpyridinium haloketones with, for example, Girard reagents "T" and "P" (betainehydrazide hydrochloride and carbohydrazinomethylpyridinium chloride, respectively), to materials prepared therewith, and to process for preparing such polymeric salts and materials.

The new class of resinous polymers of the invention consist of from 70 to approximately 100 percent by weight in linear combination of a recurring structural unit selected from those represented by the following general structures:

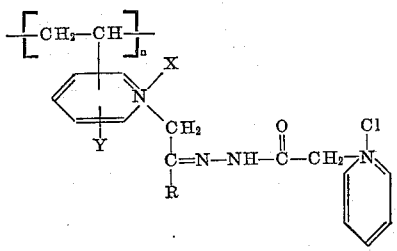

and

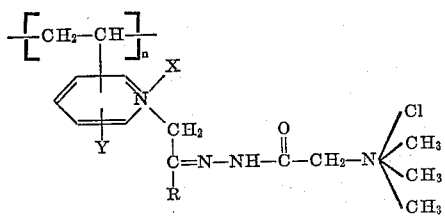

the remainder of the polymer molecule being residual C-vinylpyridinium haloketone units represented by the following general structure:

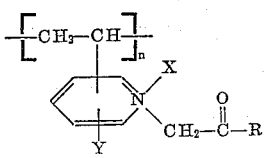

wherein in each instance $n$ represents a whole number and indicates that the group recurs, Y represents an atom of hydrogen or an alkyl group of 1 to 4 carbon atoms, X represents a halogen atom such as chlorine or bromine, and R represents an alkyl group of 1 to 4 carbon atoms or a phenyl group, e.g. methyl, ethyl, propyl, isopropyl, butyl, phenyl, etc. The above defined quaternary salt polymers are film-forming and have numerous uses, but are particularly valuable as antistatic coatings on sheet materials such as on light-sensitive photographic films to prevent static markings produced by friction in the manufacture, use and processing of the same. Each of the species coming within the above structures have their own particular characteristics as to their antistatic efficacy. Thus, a particular species may be preferred for one type of photographic application whereas for a different photographic application another species may be more adapted.

It is, accordingly, an object of this invention to provide a new class of polymeric compounds. A more specific object is to provide new polymeric salts. Another object is to provide sheet materials that are antistatic in character, and more particularly photographic films that are static resistant. Another object is to provide processes for preparing such polymeric salts and coated materials prepared therewith. Other objectives will become apparent hereinafter.

In accordance with the invention, we prepare the polymeric salts of the invention above defined by reacting certain poly-C-vinylpyridinium haloketones with Girard Reagents "T" and "P" (betaine hydrazide hydrochloride and carbohydrazinomethylpyridinium chloride, respectively) in a reaction medium of methanol, by gentle heating and stirring in a hot water bath until the reaction is substantially completed. The resulting product is soluble in the reaction mixture but may be precipitated into a non-solvent such as diethyl ether, filtered, washed with fresh ether and dried. The intermediate poly-C-vinylpyridinium haloketones may be prepared as described and claimed in our copending application Serial No. 681,601, filed of even date herewith. The Girard Reagents may be prepared according to direction in "Organic Synthesis," Collective Vol. 2, page 85 (1943), and according to Sandulesco, Helv. Chim. Acta 19, page 1095 (1936).

It is also within the invention to employ certain copolymers of vinylpyridines such as those prepared by copolymerizing the C-vinylpyridine with a lesser quantity of polymerizable monomers such as styrene, acrylic acid esters and amides, and α-alkyl substituted acrylic acid esters and amides. However, the quaternary salts of the invention prepared with the homopolymers of C-vinylpyridine are preferred.

The intermediate vinypyridine polymers of the invention may be prepared by conventional polymerization methods wherein the 2-vinylpyridine, 3-vinylpyridine, 4-vinylpyridine, 2-methyl-5-vinylpyridine, etc. monomers are heated in the presence of a polymerization catalyst such as benzoyl peroxide, ammonium persulfate, potassium persulfate, etc., in mass, in solution in an inert organic solvent or by polymerizing in emulsion form in a nonsolvent such as water, the resulting polymers being separated from the polymerization reaction mixtures by conventional means such as precipitating, filtering, washing and drying.

The accompanying drawing is a sectional view of a photographic film base 1 composed of a hydrophobic material such as a cellulose derivative, e.g. cellulose acetate, cellulose propionate, cellulose acetate-butyrate, cellulose nitrate, etc. polyamides such as nylon, a polyester such as polyethylene terephthalate and the like, has coated thereon a polymeric salt of the invention as layer 2, and on the opposite side a layer 3 of a light-sensitive material, e.g., a gelatine-silver halide emulsion. The layer 2 of the polymeric salt may also have therein a substantial proportion of gelatine if desired. Although the preferred method of employing the polymeric salts of the invention is in the form of a backing layer as shown in the drawing, the polymeric salts can also be used in the sensitive emulsion layer or used as an overcoating layer over the sensitive emulsion layer to give antistatic properties to the photographic film. However, as indicated in the drawing, application of the polymeric salts to the back of the film, i.e., to the side opposite that of the sensitive emulsion layer, is preferred.

The following examples will serve to illustrate further the preparation of the polymeric salts of the invention and the application of the same to the product of light-sensitive films having excellent antistatic properties.

EXAMPLE 1

A. 323 g. (3.07 moles) of poly-4-vinylpyridine having a viscosity [{η}=1.22] were dissolved in 2 liters of methyl alcohol by stirring at room temperature. Then 420 g. (4.5 moles) of freshly distilled chloroacetone were added to the viscous solution and the mixture was heated in a water bath at reflux temperature for 24 hours, after which time a dope was obtained which was completely water soluble. After dilution with 1 liter of methyl alcohol, the resulting quaternary salt polymer was precipitated from solution in several volumes of diethyl ether. The precipitated product was leached in two changes of ether and dried over $P_2O_5$ at reduced pressure. It was a brittle, light-buff solid. Analysis of this product showed that it contained by weight 57.8 percent of carbon, 6.2 percent of hydrogen, 7.5 percent of nitrogen and 16.8 percent of chlorine, compared with calculated theory for $C_{10}H_{12}NOCl$ of 60.7 percent, 6.0 percent, 7.1 percent and 17.9 percent respectively. Accordingly, the product was approximately 100 percent poly-4-vinylpyridinium chloroacetone represented by the following recurring structural unit:

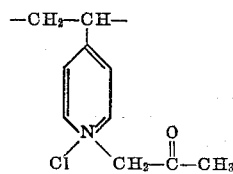

B. 100 g. (0.50 mole) of poly-4-vinylpyridinium chloroacetone prepared as in above A were dissolved in 1700 cc. of methanol by gentle heating and stirring in a hot water bath. Then 88 g. (0.501 mole) of carbohydrazinomethylpyridinium chloride (Girard reagent "P") were added and warming continued for 2 hours. After this time, the resulting dope which was water-soluble was precipitated into 10 liters of diethyl ether. The resulting buff-colored product was leached in fresh ether, filtered and dried. Analysis of this product showed that it contained by weight 51.4 percent of carbon, 5.6 percent of hydrogen, 13.2 percent of nitrogen, and 17.8 percent of chlorine compared with calculated theory for $$C_{17}H_{20}N_4OCl_2$$

of 55.7 percent, 5.4 percent, 15.2 percent, and 19.1 percent respectively. Accordingly, the resulting product contained approximately 93 percent of the following recurring structural units:

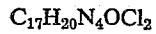
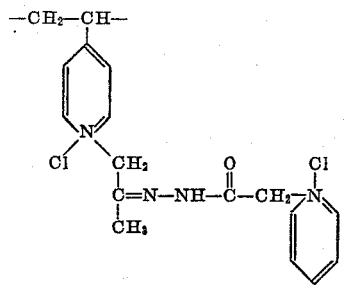

the remainder of the molecule being residual unreacted 4-vinylpyridinium chloroacetone units.

EXAMPLE 2

A. 100 g. (0.95 mole) of poly-4-vinylpyridine and 160 g. (1.03 moles) of α-chloroacetophenone were reacted in 1750 cc. of methanol and the product isolated and purified according to the method set forth in above Example 1A. The product was a buff-colored solid which on analysis was shown to contain by weight 65.7 percent of carbon, 5.7 percent of hydrogen, 5.9 percent of nitrogen and 12.9 percent of chlorine compared with calculated theory for $C_{15}H_{14}NOCl$ of 69.5 percent, 5.4 percent, 5.4 percent and 13.7 percent respectively. Accordingly the product obtained in 94 percent yield was essentially poly-4-vinylpyridinium-α-chloroacetophenone.

B. 50 g. (0.19 mole) of poly-4-vinylpyridinium-α-chloroacetophenone prepared as in above A were reacted with 33 g. (0.19 mole) of carbohydrazinomethylpyridinium chloride (Girard reagent "P") in 750 cc. of methanol and the product isolated and purified in the same manner as set forth in above Example 1B. This product was obtained in an amount of 75 g. or 87.6 percent of the theoretical value of 85.6 g. Analysis showed that it contained by weight 55.7 percent of carbon, 5.6 percent of hydrogen, 12.5 percent of nitrogen, and 15.1 percent of chlorine compared with calculated theory for $C_{22}H_{21}N_4OCl_2$ of 60.7 percent of carbon, 4.9 percent of hydrogen, 13.1 percent of nitrogen and 16.6 percent of chlorine respectively. Accordingly, the product contained approximately 90 percent by weight of the following recurring structural units:

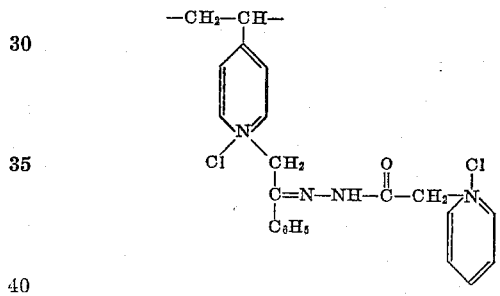

the remainder of the molecule being recurring unreacted 4-vinylpyridinium-α-chloroacetone units.

In place of the carbohydrazinomethylpyridinium chloride in above Example 1B and Example 2B, there may be substituted in each instance an equivalent amount of betaine hydrazide hydrochloride (Girard reagent "T") to give polymeric salts that comprise essentially the recurring structural units for the process of Example 1B as follows:

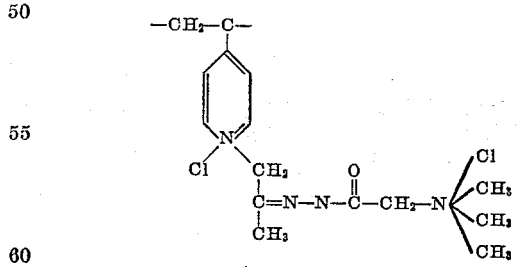

and for the process of 2B as follows:

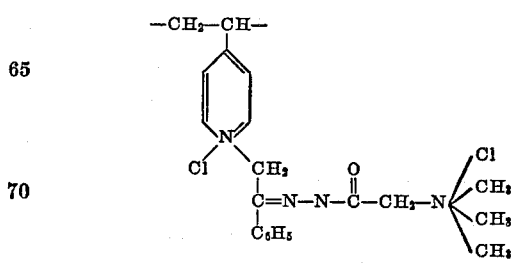

EXAMPLE 3

This example illustrates the antistatic properties of photographic films coated with the polymeric salts of the invention.

In each instance, the polymeric salt was dissolved in a mixture of acetone-water or a mixture of acetone-methanol in a concentration varying from about 0.125–2.000 percent by weight of the polymeric salt, and the solution was then applied as a backing to a sheet of cellulose acetate film base by means of a dip roller and dried. The film was then further coated on the reverse side with a suitable subbing layer and a gelatino-silver halide emulsion. The following table lists the polymeric salt, the solvent combination, the concentration of polymeric salt therein, the coverage of the coating, and the conductivity and appearance of the coated films.

Table

| Polymeric Salt | Antistatic Coating Composition | | | | Coated Film | | |
| --- | --- | --- | --- | --- | --- | --- | --- |
| | Solvent Combination—Wt. Ratios | | | Concentration Polymeric Salt, Wt. percent | Antistatic Coating | | Appearance |
| | Acetone | Methanol | Water | | Coverage, micrograms/cm.² | Conductivity × 10⁻¹⁰ mho | |
| Product of Example 1B | 35 |  | 65 | 0.125 | 2.0 | 19 | clear. |
| Do | 35 |  | 65 | 0.500 | 6.6 | 30 | Do. |
| Do | 35 |  | 65 | 2.000 |  | 260 | hazy. |
| Do | 70 | 30 |  | 0.125 | 3.5 | 15 | clear. |
| Do | 70 | 30 |  | 0.500 | 11.6 | 100 | Do. |
| Do | 70 | 30 |  | 2.000 | 62.0 | 280 | Do. |
| Do | 80 | 20 |  | 0.125 | 2.2 | 0.5 | Do. |
| Do | 80 | 20 |  | 0.500 | 0.8 | 11 | Do. |
| Do | 80 | 20 |  | 2.000 | 2.2 | 40 | Do. |
| Product of Example 2B | 80 | 20 |  | 0.250 |  | 1.7 |  |
| Do | 80 | 20 |  | 0.500 |  | 4.5 |  |
| Do | 80 | 20 |  | 1.000 |  | 23.8 |  |
| Do | 70 | 30 |  | 0.500 |  | 0.4 |  |
| Do | 70 | 30 |  | 1.000 |  | 2.1 |  |
| Do | 70 | 30 |  | 2.000 |  | 91.0 |  |

Since conductivities of the order greater than $10^{-10}$ mho have been found to alleviate difficulties from static electricity generated in the normal handling of photographic film, it will be seen from the above table that by use of the polymeric salts of the invention in appropriate concentrations and solvent combinations as coatings, films can be prepared which are free from troublesome static effects.

The conductivity measurements for the above table were carried out by placing two parallel electrodes on the film at a fixed relative humidity of 50 percent; these electrodes are long compared to the distance between them, so as to avoid end effects. The observed reading is divided by the distance between electrodes and multiplied by their length, to obtain the surface resistivity in ohms, the conductivity being the reciprocal thereof.

While the polymeric salts of the invention have been illustrated primarily in connection with their use as antistatic coatings for light-sensitive photographic films, it will be understood that coatings thereof are also efficacious in the prevention of static build up and adhesion when coated on non-sensitized surfaces such as various natural and synthetic wrapping materials. Also, various fillers, dyes softeners, etc. can be incorporated, if desired, into the coating compositions of the invention. In addition to these uses, the polymeric salts and coating compositions of the invention are also useful for rendering paper, textile materials, etc. antistatic by treatment therewith and are capable of functioning in many processes as wetting agents. In general, the solubility of the polymeric salts of the invention vary in solubility depending upon the proportion of quaternary salt units contained therein, for example, they are methanol-soluble, water-insoluble at somewhat less than 70% by weight of quaternized units but methanol-soluble, water-soluble for the salts containing 70 to approximately 100% by weight of quaternized units.

What we claim is:

1. An antistatic photographic film comprising a transparent, flexible organic film support having thereon at least one light-sensitive silver halide emulsion layer, the said film having in one outer stratum thereof, a quaternary salt of a resinous C-vinylpyridine polymer selected from the group consisting of (1) a polymer consisting of not less than 70% by weight of polymerized units of the general structure:

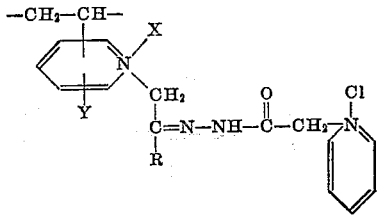

and not more than 30% by weight of polymerized units of the general structure:

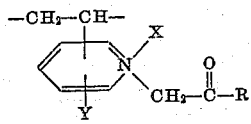

and (2) a polymer consisting of not less than 70% by weight of polymerized units of the general structure:

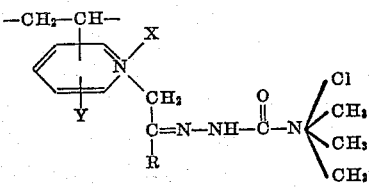

and not more than 30% by weight of polymerized units of the general structure:

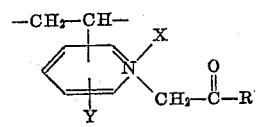

wherein in each instance Y represents a member selected from the group consisting of a hydrogen atom and an alkyl group of from 1–4 carbon atoms, X represents a member selected from the group consisting of a chlorine atom and a bromine atom and R represents a member selected from the group consisting of an alkyl group of from 1–4 carbons and phenyl group.

2. An antistatic photographic film comprising a cellulose carboxylic acid ester support having thereon at least one light-sensitive silver halide emulsion layer and on the opposite side of said support, a layer comprising a quaternated resinous 4-vinylpyridine polymer consisting of at least 70% by weight of polymerized units of the general structure:

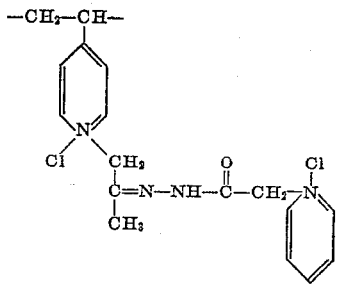

and not more than 30% by weight of polymerized 4-vinylpyridinium chloroacetone units.

3. An antistatic photographic film comprising a cellulose carboxylic acid ester support having thereon at least one light-sensitive silver halide emulsion layer and on the opposite side of said support, a layer comprising a quaternated, resinous 4-vinylpyridine polymer consisting of at least 70% by weight of polymerized units of the general structure:

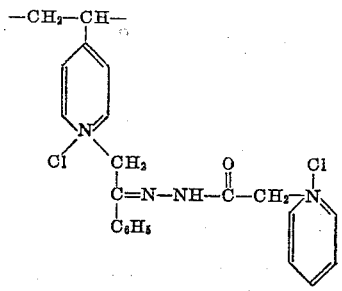

and not more than 30% by weight of polymerized 4-vinylpyridinium-α-chloroacetophenone units.

4. An antistatic photographic film comprising a cellulose carboxylic acid ester support having thereon at least one light-sensitive silver halide emulsion layer and on the opposite side of said support, a layer comprising a quaternated, resinous 4-vinylpyridine polymer consisting of at least 70% by weight of polymerized units of the general structure:

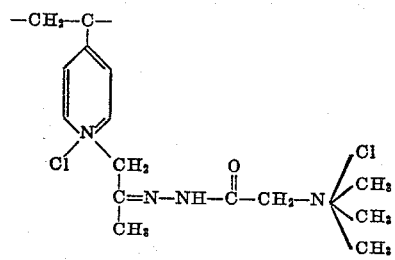

and not more than 30% by weight of polymerized 4-vinylpyridinium chloroacetone units.

5. An antistatic photographic film comprising a cellulose carboxylic acid ester support having thereon at least one light-sensitive silver halide emulsion layer and on the opposite side of said support, a layer comprising a quaternated, resinous 4-vinylpyridine polymer consisting of at least 70% by weight of polymerized units of the general structure:

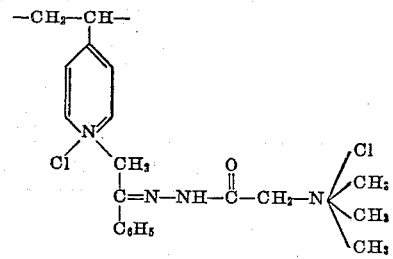

and not more than 30% by weight of polymerized 4-vinylpyridinium-α-chloroacetophenone units.

6. The antistatic photographic film according to claim 1 wherein the said support material is cellulose acetate.
7. The antistatic photographic film according to claim 2 wherein the said support is cellulose acetate.
8. The antistatic photographic film according to claim 3 wherein the said support is cellulose acetate.
9. The antistatic photographic film according to claim 4 wherein the said support is cellulose acetate.
10. The antistatic photographic film according to claim 5 wherein the said support is cellulose acetate.

References Cited in the file of this patent
UNITED STATES PATENTS

| | | |
|---|---|---|
| 2,484,430 | Sprague et al. | Oct. 11, 1949 |
| 2,548,564 | Sprague et al. | Apr. 10, 1951 |
| 2,612,446 | Umberger | Sept. 30, 1952 |
| 2,623,013 | D'Alelio | Dec. 23, 1952 |
| 2,717,834 | Saner | Sept. 13, 1955 |
| 2,717,887 | Saner | Sept. 13, 1955 |
| 2,725,297 | Morey | Nov. 29, 1955 |
| 2,843,573 | Melamed | July 15, 1958 |